(12) United States Patent
Xie et al.

(10) Patent No.: US 11,822,207 B2
(45) Date of Patent: Nov. 21, 2023

(54) METHOD AND APPARATUS FOR GENERATING OPTICAL FREQUENCY COMB

(71) Applicants: Nanjing University, Nanjing (CN); The Regents of the University of Colorado, A Body Corporate, Denver, CO (US)

(72) Inventors: Zhenda Xie, Nanjing (CN); Shuwei Huang, Nanjing (CN); Kunpeng Jia, Nanjing (CN); Xiaohan Wang, Nanjing (CN); Gang Zhao, Nanjing (CN); Shining Zhu, Nanjing (CN)

(73) Assignees: Nanjing University, Nanjing (CN); The Regents of the University of Colorado, A Body Corporate, Denver, CO (US)

( * ) Notice: Subject to any disclaimer, the term of this patent is extended or adjusted under 35 U.S.C. 154(b) by 0 days.

(21) Appl. No.: 17/711,106

(22) Filed: Apr. 1, 2022

(65) Prior Publication Data

US 2022/0221769 A1 Jul. 14, 2022

Related U.S. Application Data

(63) Continuation-in-part of application No. PCT/CN2021/096139, filed on May 26, 2021.

(51) Int. Cl.
G02F 1/35 (2006.01)
(52) U.S. Cl.
CPC ........ *G02F 1/3536* (2013.01); *G02F 2203/17* (2013.01); *G02F 2203/56* (2013.01)
(58) Field of Classification Search
None
See application file for complete search history.

(56) References Cited

U.S. PATENT DOCUMENTS 7,272,160 B1 9/2007 Geng et al.
9,190,797 B2 * 11/2015 Schneider ............. H01S 3/0085
(Continued)

FOREIGN PATENT DOCUMENTS

CN 1770573 A 5/2006
CN 104777697 A 7/2015
(Continued)

OTHER PUBLICATIONS

L. Hao, K. Jia, X. Wang, J. Guo, and Z. Xie, "Kerr Microcomb Generation With Self-injection Locked Distributed Feedback Diode Laser," in Conference on Lasers and Electro-Optics, OSA Technical Digest (Optica Publishing Group, 2020), paper JTh2E.22. (Year: 2020).*

(Continued)

*Primary Examiner* — Rhonda S Peace
(74) *Attorney, Agent, or Firm* — Laine IP Oy (57) ABSTRACT

The present disclosure discloses a method and apparatus for generating an optical frequency comb. The specific generation method comprises: receiving a pump laser that matches a thermally stable state of a nonlinear optical resonant cavity and causing the pump laser to oscillate in the nonlinear optical resonant cavity, such that a Brillouin gain corresponding to the pump laser coincides with a target longitudinal mode in the nonlinear optical resonant cavity; continuously generating a Brillouin laser at the target longitudinal mode in the case that a pump power of the pump laser exceeds a threshold for generating the Brillouin laser; and generating an optical frequency comb by using the Brillouin laser through a Kerr nonlinear four-wave mixing process. According to the technical solution of the present disclosure, the nonlinear optical resonant cavity with the Brillouin gain can generate an optical frequency comb in its thermally stable region. This optical frequency comb not only has good stability, but also has low quantum noise and narrow linewidth characteristics.

13 Claims, 3 Drawing Sheets

(56) References Cited

U.S. PATENT DOCUMENTS

2022/0221583 A1\* 7/2022 Rolland ................ H04B 10/40
2022/0221769 A1\* 7/2022 Xie ...................... G02F 1/3536

FOREIGN PATENT DOCUMENTS

| CN | 104977774 A | 10/2015 |
|---|---|---|
| CN | 107465108 A | 12/2017 |
| CN | 109494559 A | 3/2019 |
| CN | 109739060 A | 5/2019 |
| CN | 110806670 A | 2/2020 |
| EP | 3048420 A1 | 7/2016 |

OTHER PUBLICATIONS

W. Xiong, C. Yao, P. Li, Y. Wang and F. Zhu, "Temporal Cavity Solitons With Tunable High-Repetition-Rate Generation in a Brillouin Pulse Laser Cavity," in IEEE Photonics Journal, vol. 14, No. 3, pp. 1-4, Jun. 2022, Art No. 1530004, doi: 10.1109/JPHOT.2022.3173500. (Year: 2022).\*

Jia et al: Mid-infrared optical frequency comb generation from a chi-2 optical superlattice box resonator. arXiv, Jan. 4, 2019.

Zhang: Researches on the generation and characteristics of Brillouin lasing based on quartz microsphere resonator. Master Thesis in Electronics and Communication Engineering, May 2017.

Zhu: Research on threshold and pulse compression of non-focusing pumped stimulated brillouin scattering with large aperature lasers. Dissertation for the Doctoral Degree in Engineering, Harbin Institute of Technology, Dec. 2015.

\* cited by examiner

METHOD AND APPARATUS FOR GENERATING OPTICAL FREQUENCY COMB

The present disclosure claims priority to Chinese Patent Application No. 202010462932.3, filed to the CNIPA on May 27, 2020 and titled "Method and Apparatus for Generating Optical Frequency Comb", which is incorporated herein by reference in its entirety.

FIELD OF THE PRESENT DISCLOSURE

The present disclosure relates to the field of optical technologies, in particular to a method and apparatus for generating an optical frequency comb.

BACKGROUND OF THE PRESENT DISCLOSURE

An optical frequency comb (OFC) is a wide-spectrum, highly-coherent light source. The optical frequency comb is represented in a frequency domain as discrete comb-shaped spectra, which are arranged at equal frequency intervals. Since the frequency interval of the optical frequency comb is usually matched with a microwave band, the optical frequency comb may be linked with the more mature microwave frequency metrology, thereby greatly improving the measuring accuracy.

Kerr optical frequency comb is a relatively new optical frequency comb technology, with the advantages of miniaturization, high repeated frequency and high frequency comb power. Pump laser generates a Kerr optical frequency comb in a nonlinear optical resonant cavity by a Kerr nonlinear characteristic in the nonlinear optical resonant cavity. The Kerr optical frequency comb has a variety of forms, among which an optical soliton state has the lowest noise and the smoothest spectrum, and has the highest application value. Furthermore, because the nonlinear optical resonant cavity has the characteristics of flexible size and large nonlinear coefficient, the frequency interval of the optical frequency comb generated by the nonlinear optical resonant cavity can cover a wide frequency range, and thus can make up for the defects of the traditional optical frequency comb generation apparatus in the application of high repetition frequency.

However, although the current optical frequency comb generated based on the nonlinear optical resonant cavity has the above advantages, its noise level is directly affected by the quality of laser from a pumping source, and thus unable to reach the quantum noise limit of a material. Especially for an optical-soliton-based optical frequency comb, it will also be interfered by a thermal effect of a resonant cavity to cause an optical soliton state to be destroyed because this optical frequency comb works in a non-thermally stable state of the resonant cavity.

SUMMARY OF THE PRESENT DISCLOSURE

The present disclosure provides a method and apparatus for generating an optical frequency comb, so as to solve the current problems of high noise level and instability in a non-thermally stable state of an optical frequency comb generated based on a nonlinear optical resonant cavity.

In a first aspect, the present disclosure provides a method for generating an optical frequency comb, comprising:
receiving a pump laser that matches a thermally stable state of a nonlinear optical resonant cavity and causing the pump laser to oscillate in the nonlinear optical resonant cavity;
adjusting the nonlinear optical resonant cavity, such that a Brillouin gain corresponding to the pump laser coincides with a target longitudinal mode in the nonlinear optical resonant cavity;
continuously generating a Brillouin laser at the target longitudinal mode in the case that a pump power of the pump laser exceeds a threshold for generating the Brillouin laser; and
generating an optical frequency comb including optical solitons by using the Brillouin laser through a Kerr nonlinear four-wave mixing process.

In conjunction with the first aspect, in an implementable manner of the first aspect, the step of adjusting the nonlinear optical resonant cavity, such that the Brillouin gain corresponding to the pump laser coincides with the target longitudinal mode in the nonlinear optical resonant cavity includes:
adjusting a cavity length of the nonlinear optical resonant cavity so as to adjust a position of the target longitudinal mode, such that the target longitudinal mode coincides with the Brillouin gain.

In conjunction with the first aspect, in an implementable manner of the first aspect, the step of adjusting the nonlinear optical resonant cavity, such that the Brillouin gain corresponding to the pump laser coincides with the target longitudinal mode in the nonlinear optical resonant cavity further includes:
changing a stress applied to the nonlinear optical resonant cavity so as to adjust a position of the Brillouin gain, such that the Brillouin gain coincides with the target longitudinal mode, wherein the stress can be adjusted by twisting a cavity body of the nonlinear optical resonant cavity, and a twisting angle can be up to 180°.

In conjunction with the first aspect, in an implementable manner of the first aspect, the step of adjusting the nonlinear optical resonant cavity, such that the Brillouin gain corresponding to the pump laser coincides with the target longitudinal mode in the nonlinear optical resonant cavity further includes:
changing a temperature of the nonlinear optical resonant cavity so as to adjust the position of the Brillouin gain, such that the Brillouin gain coincides with the target longitudinal mode, wherein a temperature adjustment range is −10° C. to 90° C.

In conjunction with the first aspect, in an implementable manner of the first aspect, the Brillouin gain corresponding to the pump laser can also coincide with the target longitudinal mode in the nonlinear optical resonant cavity by adjusting a wavelength of the pump laser, wherein an adjustment range of the wavelength of the pump laser is 1540 nm to 1565 nm.

In conjunction with the first aspect, in an implementable manner of the first aspect, the generated optical frequency comb has discrete spectra which are arranged at equal frequency intervals, and is generated under a thermally stable state of the nonlinear optical resonant cavity, and excited by the Brillouin laser through a Kerr effect.

In conjunction with the first aspect, in an implementable manner of the first aspect, a linewidth of a single comb tooth of the generated optical frequency comb is smaller than a linewidth of the pump laser.

In conjunction with the first aspect, in an implementable manner of the first aspect, the noise of the generated optical frequency comb can reach a quantum noise limit corresponding to the nonlinear optical resonant cavity without active control.

In a second aspect, the present disclosure further provides an apparatus for generating an optical frequency comb, comprising:

a pumping source, configured to emit continuous pump laser to a nonlinear optical resonant cavity; wherein the pumping source may change a wavelength of the pump laser in a controlled manner, such that the wavelength of the pump laser matches a thermally stable state of the nonlinear optical resonant cavity, and further the pump laser can oscillate in the thermally stable state of the nonlinear optical resonant cavity and is normally emitted from the nonlinear optical resonant cavity; and the nonlinear optical resonant cavity, configured to align the received pump laser to a certain longitudinal mode in a first set of longitudinal modes in the nonlinear optical resonant cavity; wherein the nonlinear optical resonant cavity may change a position of a Brillouin gain corresponding to the pump laser or change a position of a target longitudinal mode in a second set of longitudinal modes in the nonlinear optical resonant cavity in a controlled manner, such that the Brillouin gain coincides with the target longitudinal mode; and wherein the nonlinear optical resonant cavity continuously generate a Brillouin laser at the target longitudinal mode in the case that a pump power of the pump laser exceeds a threshold for generating Brillouin laser; and wherein the Brillouin laser generates the optical frequency comb through a Kerr nonlinear four-wave mixing process.

In conjunction with the second aspect, in an implementable manner of the second aspect, the nonlinear optical resonant cavity is an optical resonant cavity having both Brillouin nonlinearity and Kerr nonlinearity.

In conjunction with the second aspect, in an implementable manner of the second aspect, the nonlinear optical resonant cavity can be a traveling wave resonant cavity or a standing wave resonant cavity.

In conjunction with the second aspect, in an implementable manner of the second aspect, the longitudinal modes in the nonlinear optical resonant cavity can be introduced by different polarization modes of the nonlinear optical resonant cavity or by transverse modes of different orders.

In conjunction with the second aspect, in an implementable manner of the second aspect, at least one set of longitudinal mode exists in the nonlinear optical resonant cavity.

As can be seen from the above technical solutions, the present disclosure discloses a method and apparatus for generating an optical frequency comb. The generation method specifically includes: receiving a pump laser that matches a thermally stable state of a nonlinear optical resonant cavity and causing the pump laser to oscillate in the nonlinear optical resonant cavity, such that a Brillouin gain corresponding to the pump laser coincides with a target longitudinal mode in the nonlinear optical resonant cavity; continuously generating a Brillouin laser at the target longitudinal mode in the case that a pump power of the pump laser exceeds a threshold for generating the Brillouin laser; and generating the optical frequency comb by using the Brillouin laser through a Kerr nonlinear four-wave mixing process. According to the technical solutions of the present disclosure, the nonlinear optical resonant cavity with the Brillouin gain can be configured to generate the optical frequency comb in its thermally stable region. This optical frequency comb not only has good stability, but also has low quantum noise and narrow linewidth characteristics.

BRIEF DESCRIPTION OF THE DRAWINGS

To describe the technical solutions of the present disclosure more clearly, the following briefly introduces the accompanying drawings required for describing the embodiments. Apparently, a person of ordinary skill in the art may still derive other drawings from these accompanying drawings without creative efforts.

FIG. 4 (1) is a schematic diagram of a spectrum of an optical frequency comb generated by an optical fiber F-P cavity provided by an embodiment of the present disclosure;

FIG. 4 (2) is a schematic diagram of a beat frequency signal of the optical frequency comb generated by the optical fiber F-P cavity provided by an embodiment of the present disclosure;

FIG. 5 (1) is a schematic diagram of a linewidth of a single comb tooth of the optical frequency comb generated by the optical fiber F-P cavity provided by an embodiment of the present disclosure;

FIG. 5 (2) is a schematic diagram of a phase noise of the optical frequency comb generated by the optical fiber F-P cavity provided by an embodiment of the present disclosure.

DESCRIPTION OF THE EMBODIMENTS

A Kerr optical frequency comb in a nonlinear optical resonant cavity is generated by using a Kerr nonlinear characteristic in the nonlinear optical resonant cavity, wherein the optical resonant cavity is a cavity in which light waves are reflected back and forth so as to provide optical energy feedback, and the nonlinear effects are effects due to the nonlinear polarization of the medium under the action of strong light, for example, optical harmonics, frequency doubling, two-photon absorption, self-scattering focus, etc. The Kerr optical frequency comb has a variety of forms, among which an optical soliton state has the lowest noise and the smoothest spectrum, and has the highest application value and most versatile use. Furthermore, because the nonlinear optical resonant cavity has the characteristics of flexible size, large nonlinear coefficient and the like, a frequency interval of the optical frequency comb generated by the nonlinear optical resonant cavity can cover a wide frequency range, and thus can make up for the defects of the traditional optical frequency comb generation apparatus in the application of high repetition frequency. At the same time, this method for generating the optical frequency comb is also conducive to integrated applications.

It should be noted that optical solitons are pulses of light that travel over long distances while maintaining the same shape. A light pulse contains many different frequency components, with different frequencies and different propagation speeds in the medium. As a result, the light pulse will disperse in the optical fiber, making the pulse width wider. However, when a very narrow monochromatic light pulse with high intensity is incident in the optical fiber, it will produce the Kerr effect, that is, the refractive index of the medium changes with the intensity of light, which leads to self-phase modulation in the light pulse, so that the phase change generated by the front edge of the pulse causes the frequency to decrease, and the phase change generated by the back edge of the pulse causes the frequency to increase, so the front edge of the pulse propagates slower than its back edge, thus making the pulse width narrower. When the pulse has the appropriate amplitude, the above two effects can exactly offset, then the pulse can keep the waveform stable and unchanged in the fiber transmission, that is, an optical soliton is formed.

Optical soliton is usually used in communication, which, for example, generally has the following characteristics: firstly, the transmission code rate of optical soliton can generally reach 20 Gb/s, up to 100 Gb/s or more, so its capacity is large; secondly, the optical soliton remains unchanged during transmission, and the optical soliton has adiabatic characteristics, which makes bit error rate (BER) of the optical soliton transmission much lower than conventional fiber optic communication, so its BER is low and anti-interference ability is strong; thirdly, ordinary fiber optic communication must set up a relay station every few tens of kilometers, and the signal pulse is shaped, amplified, and checked for error codes before being transmitted, while the optical soliton communication can be used without a relay station, and as long as the fiber loss gain compensation, the optical signal can be transmitted without distortion to very far away, thus eliminating the complicated process of photoelectric conversion, reshaping and amplification, checking the error code, electro-optical conversion and retransmission. For these reasons, the optical soliton state is said to have the lowest noise and the smoothest spectrum.

In principle, when a laser beam is injected into the nonlinear optical resonant cavity, the nonlinear optical resonant cavity will have two states: a thermally stable state and a non-thermally stable state. During the generation process of an optical-soliton-based optical frequency comb, a pump laser and a nonlinear optical resonant cavity will have a fixed phase relationship. This phase relationship is usually non-thermally stable, and the generation of the optical frequency comb is based on the non-thermally stable state. The high-power density in the nonlinear optical resonant cavity during the generation of the optical frequency comb will produce a thermal effect. This thermal effect will cause the fixed phase relationship (i.e., non-thermally stable state) to be disturbed and unable to be maintained stably, which in turn makes it difficult for the optical frequency comb to maintain its stable state.

Although there are some methods to maintain the stability of an optical frequency comb, most of them require a series of complicated pump tuning, feedback and control mechanisms, etc., to artificially maintain the relative stability in phases of a pump laser and a resonant cavity. These methods are not only complicated to operate, but also dependent on human operations.

In addition, the linewidth and noise characteristics of the optical frequency comb generated by the nonlinear optical resonant cavity are directly limited by the characteristics of the pump laser. The commonly used methods to maintain the stability of an optical frequency comb are also difficult to solve the limitation of the pump laser on the characteristics of the optical frequency comb.

Based on the above content, embodiments of the present disclosure provide an apparatus and method for generating an optical frequency comb, which can generate an optical frequency comb in a thermally stable state of a nonlinear optical resonant cavity. This optical frequency comb not only has good stability, but also has lower quantum noise and smaller linewidth.

Figure 1:
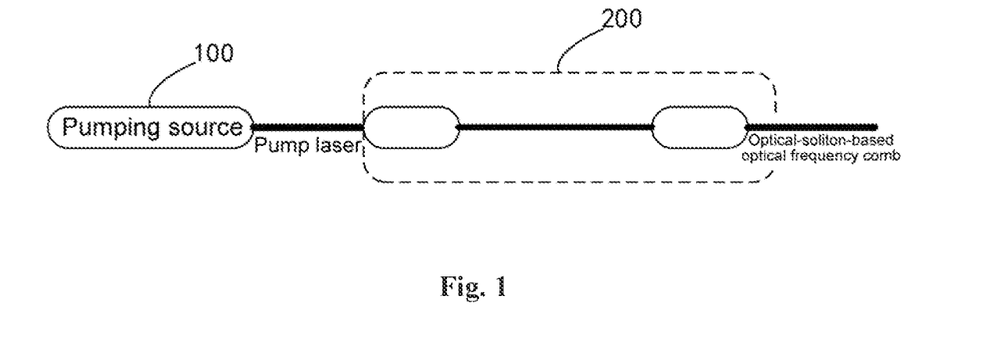
FIG. 1 is a schematic structural diagram of an apparatus for generating an optical frequency comb provided by an embodiment of the present disclosure.

FIG. 1 is a schematic structural diagram of an apparatus for generating an optical frequency comb provided by an embodiment of the present disclosure. As shown in FIG. 1, the optical frequency comb in this embodiment of the present disclosure mainly includes two parts, i.e., a pumping source 100 and a nonlinear optical resonant cavity 200. The pumping source 100 is configured to emit a continuous pump laser to the nonlinear optical resonant cavity 200. The pumping source 100 may change a wavelength of the pump laser under the control over the adjustment of a current and temperature of the pumping source 100 itself, such that a wavelength of the pump laser matches a thermally stable state of the nonlinear optical resonant cavity 200, and that the pump laser can oscillate in the thermally stable state of the nonlinear optical resonant cavity 200 and is normally emitted from the nonlinear optical resonant cavity 200.

The nonlinear optical resonant cavity 200 is configured to align the received pump laser to a certain longitudinal mode in a first set of longitudinal modes in the nonlinear optical resonant cavity 200. The nonlinear optical resonant cavity 200 may change a position of a Brillouin gain corresponding to the pump laser or change a position of a target longitudinal mode in a second set of longitudinal modes in the nonlinear optical resonant cavity 200 under the control over the adjustment of a cavity length, stress and temperature of the nonlinear optical resonant cavity 200 itself, such that the Brillouin gain coincides with the target longitudinal mode. The nonlinear optical resonant cavity 200 continuously generates a Brillouin laser at the target longitudinal mode in the case that a pump power of the pump laser exceeds a threshold for generating Brillouin laser. The Brillouin laser generates the optical frequency comb through a Kerr nonlinear four-wave mixing process.

In an embodiment of the present disclosure, gain is simply defined as the amplification. In electronics, it is usually the ratio of the signal output to the signal input of a system. For example, amplifier gain represents the amplifier power amplification, which is represented by the common logarithm of the ratio of output power to input power, etc.

Generally, a resonant cavity is thermally stable for a pump laser of a specific wavelength, that is, the pump laser of the specific wavelength is not affected or less affected by a thermal effect in the resonant cavity when entering the resonant cavity, and is normally emitted from the resonant cavity. When a pump laser that does not belong to a specific wavelength enters the resonant cavity, the thermal effect in the resonant cavity will affect the oscillation and propagation of this pump laser in the resonant cavity, and the pump laser cannot be ideally emitted from the resonant cavity. Therefore, in order to ensure that the pump laser injected into the nonlinear optical resonant cavity 200 can be emitted normally, the wavelength of the pump laser emitted by the pumping source 100 in this embodiment of the present disclosure needs to match a thermally stable state of the nonlinear optical resonant cavity 200, so as to enable the pump laser to oscillate in the thermally stable state of the nonlinear optical resonant cavity 200. The aforementioned specific wavelength may be a specific wavelength or a specific wavelength range.

Figure 2:
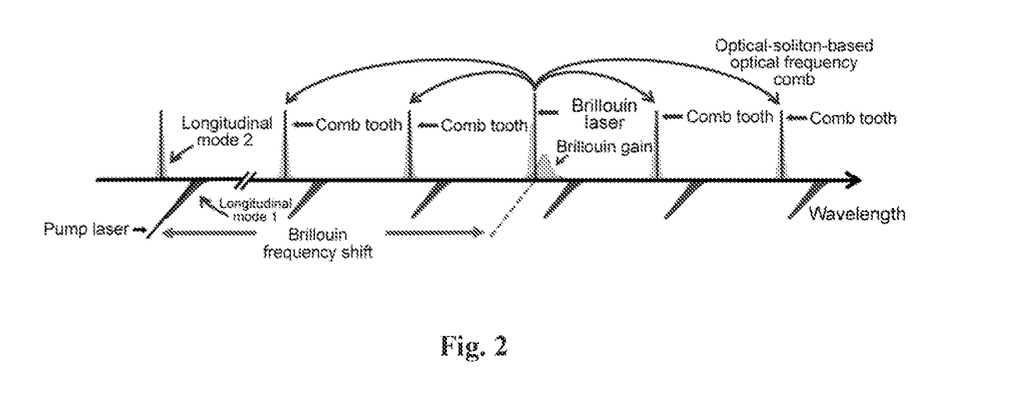
FIG. 2 is a schematic diagram of light oscillation in a nonlinear optical resonant cavity provided by an embodiment of the present disclosure.

FIG. 2 is a schematic diagram of light oscillation in a nonlinear optical resonant cavity provided by an embodiment of the present disclosure. As shown in FIG. 2, there may be multiple sets of longitudinal modes in the nonlinear optical resonant cavity 200. The longitudinal mode, such as longitudinal mode 1 and longitudinal mode 2 in FIG. 2, is a stable optical wave oscillation mode along the axial direction of the nonlinear optical resonant cavity 200, which has a large impact on the output frequency of the laser and can greatly improve the coherence of the laser. In order to generate an optical frequency comb in a thermally stable state, it is necessary to align a pump laser to a thermally stable state of a certain longitudinal mode resonance peak in one set of longitudinal modes, wherein the resonance peaks usually refer to some areas of the optical spectrum where the energy is relatively concentrated, and may refer to areas where the light is relatively concentrated in the embodiments of the present disclosure. For example, one can align the pump laser to a certain longitudinal mode in longitudinal modes 1, and make a Brillouin gain corresponding to the pump laser in the nonlinear optical resonant cavity 200 coincide with a certain longitudinal mode in another set of longitudinal modes, e.g., a certain longitudinal mode in longitudinal modes 2. In addition, when a pump power exceeds a Brillouin threshold, a continuous Brillouin laser can be generated at a certain longitudinal mode in the longitudinal modes 2. Further, due to the characteristics of the nonlinear optical resonant cavity 200 itself, the Brillouin laser can excite an optical frequency comb with discrete spectra, which are arranged at equal frequency intervals, in the nonlinear optical resonant cavity 200 based on a Kerr nonlinear four-wave mixing mechanism. As shown in FIG. 2, a Brillouin laser can be generated in a longitudinal mode of the nonlinear optical resonant cavity 200, and then an optical frequency comb can be generated on the longitudinal mode.

That is, in the embodiment of the present disclosure, the optical frequency comb is generated under thermally stable conditions in the nonlinear optical resonant cavity 200, and the optical frequency comb is excited by the Brillouin laser through the Kerr effect, wherein the Kerr effect is an electrically induced refraction phenomenon proportional to the electric field intensity.

In general cases, there are several sets of longitudinal modes in the nonlinear optical resonant cavity 200. In actual use, a specific set of longitudinal modes can be selected according to actual needs to generate an optical frequency comb. In addition, the longitudinal modes in the nonlinear optical resonant cavity 200 can be introduced by different polarization modes of the nonlinear optical resonant cavity 200 or by transverse modes of different orders.

The pumping source 100 is a tunable continuous light laser device, a pump laser emitted by this pumping source 100 is a single wavelength light. The Brillouin laser generated at the longitudinal mode of the nonlinear optical resonant cavity 200 is also a single-wavelength laser, and the resulting optical frequency comb contains laser light of multiple wavelengths.

In this embodiment of the present disclosure, after the optical frequency comb is generated, because the pump laser works in the thermally stable state of the nonlinear optical resonant cavity and can resist the disturbance caused by frequency jitter, environmental temperature changes and other factors, the generated Brillouin laser can always maintain a fixed phase relationship with the nonlinear optical resonant cavity, thereby generating a self-stabilized optical frequency comb. In addition, the generated optical frequency comb also has a linewidth several orders of magnitude smaller than the pump laser due to the narrowing linewidth characteristic of the Brillouin laser itself.

Figure 3:
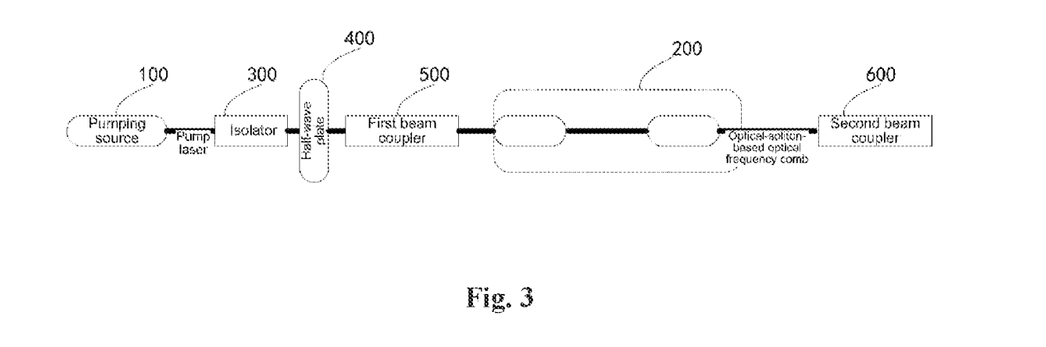
FIG. 3 is a schematic structural diagram of another apparatus for generating an optical frequency comb provided by an embodiment of the present disclosure.
Figure 4:
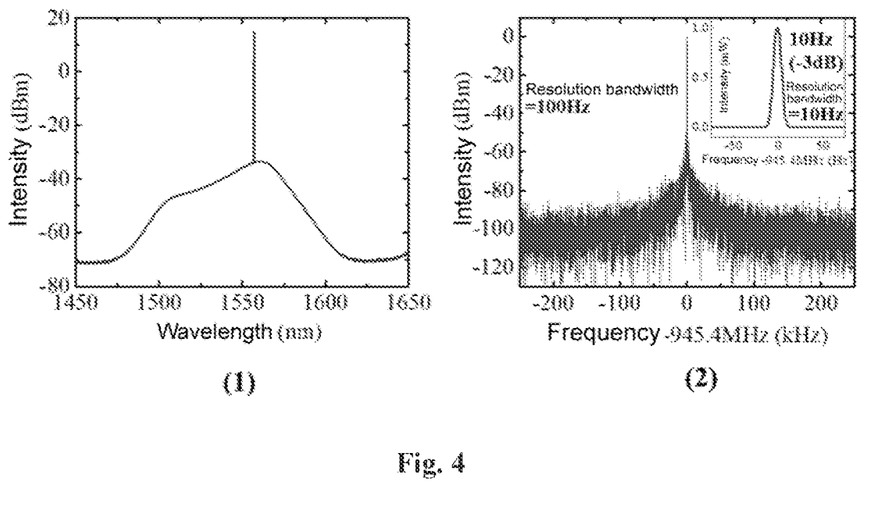
Figure 5:
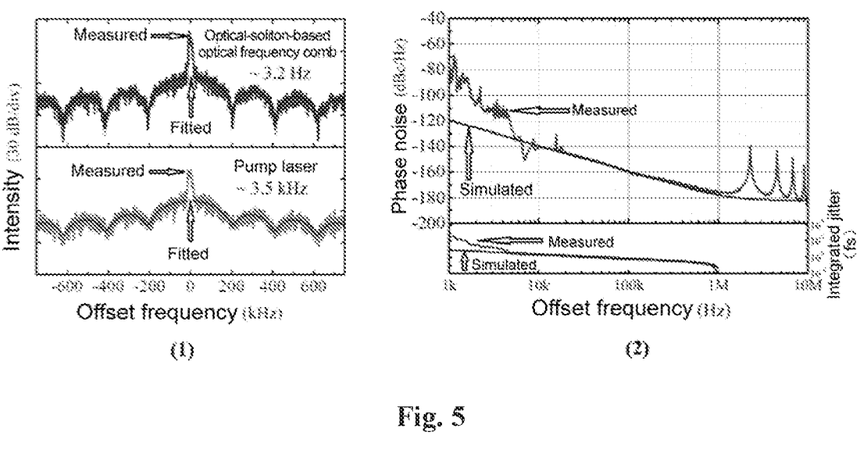

FIG. 3 is a schematic structural diagram of another apparatus for generating an optical frequency comb provided by an embodiment of the present disclosure. In some embodiments, in order to better collect the pump laser emitted by the pumping source 100 into the nonlinear optical resonant cavity 200, an isolator 300, a half-wave plate 400 and a first beam coupler 500 need to be arranged in sequence between the pumping source 100 and the nonlinear optical resonant cavity 200, as specifically shown in FIG. 3.

The isolator 300 is configured to control a direction of the pump laser, and only allow the pump laser to pass through in one direction, so as to prevent the light reflection from interfering with the normally emitted pump laser.

The half-wave plate 400 is configured to rotate a polarization plane of the pump laser passing through the isolator 300, such that the pump laser passing through the isolator 300 can match a certain longitudinal mode in the first set of longitudinal modes in the nonlinear optical resonant cavity 200.

The first beam coupler 500 is configured to couple the pump laser passing through the half-wave plate 400 into the nonlinear optical resonant cavity 200.

In order to collect and use the optical frequency comb generated by the nonlinear optical resonant cavity 200, a second beam coupler 600 is also provided at an output position of the nonlinear optical resonant cavity 200 to receive the optical frequency comb generated by the nonlinear optical resonant cavity 200.

According to the apparatus for generating the optical frequency comb in some embodiments, a pump laser beam emitted by the pumping source 100 passes through the isolator 300, the half-wave plate 400 is rotated to control the polarization of the pump laser beam, and the light beam is then coupled into the nonlinear optical resonant cavity 200 through the first beam coupler 500. In the nonlinear optical resonant cavity 200, a Brillouin gain corresponding to a wavelength of the pumping source 100 coincides with a target longitudinal mode in the second set of longitudinal modes of the nonlinear optical resonant cavity 200, and a continuous Brillouin laser can be generated at the target longitudinal mode. Further, due to the characteristics of the nonlinear optical resonant cavity 200 itself, the Brillouin laser can excite an optical frequency comb with discrete spectra, which are arranged at equal frequency intervals, in the nonlinear optical resonant cavity 200 based on a four-wave mixing mechanism. Finally, the output optical frequency comb is collected by the second beam coupler 600.

In some embodiments, after the optical frequency comb is generated, because the pump laser works in the thermally stable state of the nonlinear optical resonant cavity and can resist the disturbance caused by frequency jitter, environmental temperature changes and other factors, the generated Brillouin laser can always maintain a fixed phase relationship with the nonlinear optical resonant cavity, thereby generating a self-stabilized optical frequency comb. In addition, the generated optical frequency comb also has a linewidth several orders of magnitude smaller than the pump laser due to the narrowing linewidth characteristic of the Brillouin laser itself.

In the resonant cavity, the position of its resonant peak is affected by its material, length and other factors. Different resonant cavities have different resonant peak positions, and further the conditions for achieving thermally stable states of these resonant cavities are also different. However, for different resonant cavities, they can all be used as the nonlinear optical resonant cavity 200 in the present disclosure as long as they can generate a Brillouin gain. In practical applications, such nonlinear optical resonant cavities 200 are mostly made of nonlinear materials with a Brillouin gain. In addition, the structures of the optical resonant cavities include but are not limited to a Fabry-Perot cavity (F-P cavity), a linear cavity, a ring cavity, a whispering gallery mode cavity, and the like.

In order to understand the characteristics of the optical frequency comb with low noise and having a small linewidth, etc., in the embodiment of the present disclosure, the following is an example of the optical fiber F-P cavity, which is applied to the embodiment of the present disclosure. The F-P cavity, i.e., the Fabry-Perot cavity, is one of the optical resonant cavities. In one implementation, the F-P cavity is used as an example to illustrate how to obtain an optical frequency comb with good stability and low quantum noise. The specific content is as follows.

In some embodiments, the optical fiber F-P cavity as used has a quality factor of $3.4 \times 10^7$, and a free spectral range (FSR) of 945.4 MHz. When the power of the pump laser coupled into the optical fiber cavity is gradually increased, a Brillouin laser can be generated in the cavity. At this time, an optical frequency comb such as optical soliton optical frequency comb can be generated by adjusting a frequency of the pump laser.

FIG. 4(1) is a schematic diagram of a spectrum of the optical frequency comb generated by the optical fiber F-P cavity provided by an embodiment of the present disclosure; and FIG. 4(2) is a schematic diagram of a beat frequency signal of the optical frequency comb generated by the optical fiber F-P cavity provided by an embodiment of the present disclosure. As can be seen from FIG. 4(1) and FIG. 4(2), the optical frequency comb has a smooth spectrum, a 30 dB bandwidth exceeding 100 nm, and a beat frequency linewidth exceeding a resolution limit of an instrument, and thus demonstrates a strong optical comb coherence. The optical frequency comb can be maintained for several hours in a free-running state, and has good passive stability, that is, when the optical fiber F-P cavity is in a thermally stable state, the optical frequency comb is unlikely to be affected.

FIG. 5(1) is a schematic diagram of a linewidth of a single comb tooth of the optical frequency comb generated by the optical fiber F-P cavity provided by an embodiment of the present disclosure; and FIG. 5(2) is a schematic diagram of a phase noise of the optical frequency comb generated by the optical fiber F-P cavity provided by an embodiment of the present disclosure. As can be seen from FIG. 5(1) and FIG. 5(2), a single comb tooth of the optical frequency comb has a linewidth that is more than three orders of magnitude smaller than that of the pump laser, and the phase noise can reach a quantum noise limit (−180 dBc/Hz) in a range of 10 kHz or more.

As can be seen from the above content, in this embodiment of the present disclosure, the optical fiber F-P cavity can be preferably used as the nonlinear optical resonant cavity 200 to generate the optical frequency comb in a thermally stable state, and the generated optical frequency comb has the following characteristics.

First of all, the optical frequency comb can achieve a repetition frequency of a microwave band, that is, a frequency interval between comb teeth in the optical frequency comb is 1 GHz to 1 THz. However, a traditional mode-locked laser device usually achieves a repetition frequency of less than 1 GHz, and a traditional Kerr microcavity optical frequency comb generally achieves a repetition frequency of more than 10 GHz. Therefore, the optical frequency comb provided by thus embodiment of the present disclosure can fill up a frequency gap of the traditional optical frequency combs.

Secondly, the pump laser works in the thermally stable state of the resonant cavity, and therefore the generated optical frequency comb such as optical soliton optical frequency comb has good passive stability in a free-running state and can be maintained for several hours, and can well resist the disturbance caused by frequency jitter of a laser device, thermal drift of the resonant cavity, and the like. In contrast, the traditional Kerr optical frequency comb has poor passive stability, and is likely to lose an optical soliton state once it is disturbed.

Furthermore, because the Brillouin laser has the narrowing linewidth characteristic, that is, the Brillouin laser that resonates in the resonant cavity has a narrower linewidth than the pump laser, and usually has a linewidth narrowing effect up to more than 1000 times. Furthermore, the optical frequency comb produced by the Brillouin laser also has the same narrowing linewidth characteristic, which greatly reduces the requirements for the linewidth of the pump laser. For the traditional Kerr optical frequency comb, a four-wave mixing mechanism makes the linewidth of the Kerr optical frequency comb certainly be greater than or equal to the linewidth of the pump laser.

Finally, it is known from the combination of FIG. 5 (1) and FIG. 5 (2) that the phase noise of the optical frequency comb can reach the quantum noise limit of −180 dBc/Hz in the range above 10 kHz, that is, the optical frequency comb generated in this embodiment of the present disclosure has a phase noise level up to the quantum noise limit of −180 dBc/Hz, and has a high application value in the fields of microwave photonics, etc. In contrast, the traditional Kerr optical frequency comb has a phase noise level of the quantum noise limit of 150 to 160 dBc/Hz.

The conventional F-P cavity is also referred to as a plane parallel cavity and consists of two parallel plane mirrors. As can be seen from the above content, it is preferable in this embodiment of the present disclosure to use the optical fiber F-P cavity to generate an optical frequency comb. However, in some embodiments, optical frequency combs generated by other cavities, such as the linear cavity, the ring cavity, or the whispering gallery mode cavity through the above-mentioned method for generating the optical frequency comb, may also be more stable than the current Kerr optical frequency comb, and also have a narrower linewidth and lower quantum noise, which will not be explained here. The schematic diagrams of pump laser oscillating in these cavities are shown in FIG. 2.

Figure 6:
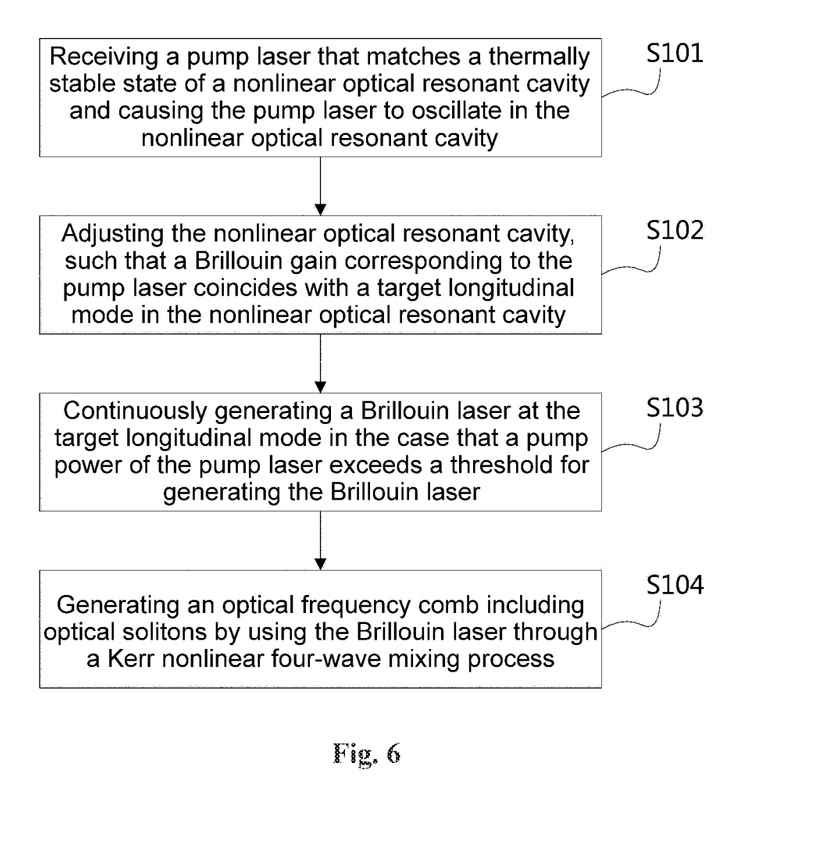
FIG. 6 is a flowchart of a method for generating an optical frequency comb provided by an embodiment of the present disclosure.

FIG. 6 is a flowchart of a method for generating an optical frequency comb provided by an embodiment of the present disclosure. As shown in FIG. 6, the method is specifically implemented in the nonlinear optical resonant cavity 200, and includes the following steps S101 to S104.

In S101, a pump laser that matches a thermally stable state of the nonlinear optical resonant cavity 200 is received, such that the pump laser oscillates in the nonlinear optical resonant cavity 200.

A resonant cavity is thermally stable for a pump laser of a specific wavelength, that is, the pump laser of the specific wavelength is not affected or less affected by a thermal effect in the resonant cavity when entering the resonant cavity, and is normally emitted from the resonant cavity. When a pump laser that does not belong to a specific wavelength enters the resonant cavity, the thermal effect in the resonant cavity will affect the oscillation and propagation of this pump laser in the resonant cavity, and thus the pump laser cannot be ideally emitted from the resonant cavity. Therefore, in order to ensure that the pump laser injected into the nonlinear optical resonant cavity 200 can be emitted normally, the wavelength of the pump laser emitted by the pumping source 100 is changed in this embodiment of the present disclosure, by adjusting a current, temperature or other parameters of the pumping source 100, such that the pump laser can match the thermally stable state of the nonlinear optical resonant cavity 200, and further the pump laser can oscillate in the thermally stable state of the nonlinear optical resonant cavity 200.

In step S102, the nonlinear optical resonant cavity 200 is adjusted, such that a Brillouin gain corresponding to the pump laser coincides with a target longitudinal mode in the nonlinear optical resonant cavity 200.

In step S103, a Brillouin laser is continuously generated at the target longitudinal mode in the case that a pump power of the pump laser exceeds a threshold for generating the Brillouin laser.

Generally, the Brillouin gain is related to a variety of the nonlinear optical resonant cavity 200. Different nonlinear optical resonant cavities 200 have different Brillouin frequency shift, and further, the position of the Brillouin gain in FIG. 2 will change. When the Brillouin gain coincides with a target longitudinal mode of the nonlinear optical resonant cavity 200, or a target longitudinal mode has a part overlapping with the Brillouin gain, and when the pump power of the pumping source 100 exceeds the threshold for generating the Brillouin laser, a Brillouin laser will be generated at the target longitudinal mode.

In order to coincide the Brillouin gain with the target longitudinal mode, it is necessary to adjust the position of the Brillouin gain or the position of the target longitudinal mode. When the nonlinear optical cavity 200 is made of a fixed material, the position of the target longitudinal mode is related to a cavity length of the nonlinear optical cavity 200, and the frequency shift of the Brillouin gain is related to a shape of the nonlinear optical cavity 200. Therefore, the specific way to adjust the position of the Brillouin gain or the position of the target longitudinal mode is as follows.

A cavity length of the nonlinear optical resonant cavity 200 is adjusted so as to adjust a position of the longitudinal mode, such that the longitudinal mode coincides with the Brillouin gain, wherein a length variation of the cavity length is usually on the order of micrometers.

Alternatively, the stress of the nonlinear optical resonant cavity 200 is adjusted so as to adjust the position of the Brillouin gain, such that the Brillouin gain coincides with the longitudinal mode. Taking the above-mentioned optical fiber F-P cavity as an example, the stress can be adjusted by twisting a cavity body of the optical fiber F-P cavity, wherein a twist angle of the cavity body of the optical fiber F-P cavity can be up to 180°.

Alternatively, the temperature of the nonlinear optical resonant cavity 200 is changed so as to adjust the position of the Brillouin gain, such that the Brillouin gain coincides with the longitudinal mode. Taking the above-mentioned optical fiber F-P cavity as an example, when the temperature is adjusted, a temperature adjustment range is about −10° C. to 90° C.

Alternatively, the wavelength of the pump laser is changed by adjusting the pumping source 100, such that the Brillouin gain coincides with the longitudinal mode. If the pumping source 100 is applied to the above-mentioned optical fiber F-P cavity, a wavelength adjustment range of the pumping source 100 is usually 1540 nm to 1565 nm.

In S104, an optical frequency comb is generated by using the Brillouin laser through a Kerr nonlinear four-wave mixing process.

The nonlinear optical resonant cavity 200 in this embodiment of the present application has both Brillouin nonlinearity and Kerr nonlinearity. In addition, based on these properties, the nonlinear optical resonant cavity 200 itself has a Kerr nonlinear four-wave mixing mechanism. Kerr nonlinear four-wave mixing is an intermodulation phenomenon in nonlinear optics, in which an interaction between two or three wavelengths produces two or one new wavelength. Therefore, after a single-wavelength Brillouin laser undergoes four-wave mixing, optical frequency combs with different wavelengths or frequencies are generated.

It is worth noting that the above-mentioned method of adjusting the position of the Brillouin gain or the position of the longitudinal mode is not limited to adjusting the cavity length or changing the stress applied on the resonant cavity or changing the temperature of the resonant cavity or changing the wavelength of the pump laser, and other methods that can adjust the position of the Brillouin gain or the position of the longitudinal mode are also applicable in the present disclosure.

In addition, the above-mentioned method of adjusting the position of the Brillouin gain or the position of the longitudinal mode is only described by taking the optical fiber F-P cavity as an example. In practical applications, there are many varieties of nonlinear optical resonant cavities 200 that can be used. Other nonlinear optical resonant cavities 200 can also adopt the above-mentioned specific stress adjustment method, temperature adjustment range, and pump laser wavelength adjustment range, etc., or adaptively adjust the length variation range of the cavity length, the twist angle of the cavity body, the temperature adjustment range, and the wavelength adjustment range of the pump laser based on their own characteristics, attributes, etc., and by referring to these adjustment methods and adjustment ranges.

In conjunction with the content of the above embodiments of the apparatus and method for generating the optical frequency comb, a stable optical frequency comb can be obtained. Therefore, an embodiment of the present disclosure also specifically provides an optical frequency comb, which has discrete spectra arranged at equal frequency intervals, and is also generated in a thermally stable state of the nonlinear optical resonant cavity 200. The nonlinear optical resonant cavity 200 is referred to a resonant cavity having both Kerr nonlinearity and Brillouin gain. Moreover, in an optimal case, the linewidth of the optical frequency comb is several orders of magnitude, for example, three orders of magnitude, smaller than the linewidth of the pump laser; the phase noise level of the quantum noise limit of the optical frequency comb is −180 dBc/Hz; and the repetition frequency of the optical frequency comb is about 1 GHz.

As can be seen from the above technical solutions, the present disclosure discloses a method and apparatus for generating an optical frequency comb. The generation method specifically includes: receiving a pump laser that matches a thermally stable state of a nonlinear optical resonant cavity and causing the pump laser to oscillate in the nonlinear optical resonant cavity, such that a Brillouin gain corresponding to the pump laser coincides with a target longitudinal mode in the nonlinear optical resonant cavity; continuously generating a Brillouin laser at the target longitudinal mode in the case that a pump power of the pump laser exceeds a threshold for generating the Brillouin laser; and generating an optical frequency comb by using the Brillouin laser through a Kerr nonlinear four-wave mixing process. According to the technical solutions of the present disclosure, the nonlinear optical resonant cavity with the Brillouin gain can be generate an optical frequency comb in its thermally stable region. This optical frequency comb has not only good stability, but also low quantum noise and narrow linewidth characteristics.

Other embodiments of the present disclosure will be apparent to those skilled in the art from consideration of the specification and practice the present disclosure herein. The present disclosure is intended to cover any variations, uses, or adaptations of the present disclosure, following the general principles thereof and including common knowledge or commonly used technical measures which are not disclosed herein. The specification and embodiments are to be considered as exemplary only, and the true scope and spirit of the present disclosure are indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only limited by the appended claims.

What is claimed is:

1. A method for generating an optical frequency comb, comprising:
   receiving a pump laser that matches a thermally stable state of a nonlinear optical resonant cavity and causing the pump laser to oscillate in the nonlinear optical resonant cavity;
   adjusting the nonlinear optical resonant cavity, such that a Brillouin gain corresponding to the pump laser coincides with a target longitudinal mode in the nonlinear optical resonant cavity;
   continuously generating Brillouin laser at the target longitudinal mode in the case that a pump power of the pump laser exceeds a threshold for generating the Brillouin laser; and
   generating an optical frequency comb including optical solitons by using the Brillouin laser through a Kerr nonlinear four-wave mixing process.

2. The generation method according to claim 1, wherein the step of adjusting the nonlinear optical resonant cavity, such that the Brillouin gain corresponding to the pump laser coincides with the target longitudinal mode in the nonlinear optical resonant cavity comprises:
   adjusting a cavity length of the nonlinear optical resonant cavity so as to adjust a position of the target longitudinal mode, such that the target longitudinal mode coincides with the Brillouin gain.

3. The generation method according to claim 1, wherein the step of adjusting the nonlinear optical resonant cavity, such that the Brillouin gain corresponding to the pump laser coincides with the target longitudinal mode in the nonlinear optical resonant cavity further comprises:
   changing a stress applied by the nonlinear optical resonant cavity so as to adjust a position of the Brillouin gain, such that the Brillouin gain coincides with the target longitudinal mode, wherein the stress is adjusted by twisting a cavity body of the nonlinear optical resonant cavity, and a twisting angle is in the range of 0° to 180°.

4. The generation method according to claim 1, wherein the step of adjusting the nonlinear optical resonant cavity, such that the Brillouin gain corresponding to the pump laser coincides with the target longitudinal mode in the nonlinear optical resonant cavity further comprises:
   changing a temperature of the nonlinear optical resonant cavity so as to adjust the position of the Brillouin gain, such that the Brillouin gain coincides with the target longitudinal mode, wherein a temperature adjustment range is −10° C. to +90° C.

5. The generation method according to claim 1, wherein the Brillouin gain corresponding to the pump laser is caused to coincide with the target longitudinal mode in the nonlinear optical resonant cavity by adjusting a wavelength of the pump laser, wherein an adjustment range of the wavelength of the pump laser is 1540 nm to 1565 nm.

6. The generation method according to claim 1, wherein the generated optical frequency comb has discrete spectra which are arranged at equal frequency intervals, wherein the optical frequency comb is generated under a thermally stable state of the nonlinear optical resonant cavity, and excited by the Brillouin laser through a Kerr effect.

7. The generation method according to claim 1, wherein a linewidth of a single comb tooth of the generated optical frequency comb is smaller than a linewidth of the pump laser.

8. The generation method according to claim 1, wherein a noise of the generated optical frequency comb reaches a quantum noise limit corresponding to a nonlinear microcavity without active control.

9. An apparatus for generating an optical frequency comb, comprising:
   a pumping source, configured to emit a continuous pump laser to a nonlinear optical resonant cavity; wherein the pumping source changes a wavelength of the pump laser in a controlled manner, such that the wavelength of the pump laser matches a thermally stable state of the nonlinear optical resonant cavity, and that the pump laser oscillates in the thermally stable state of the nonlinear optical resonant cavity and is emitted from the nonlinear optical resonant cavity; and
   the nonlinear optical resonant cavity, configured to align the received pump laser to a certain longitudinal mode in a first set of longitudinal modes in the nonlinear optical resonant cavity; wherein the nonlinear optical resonant cavity changes a position of a Brillouin gain corresponding to the pump laser or changes a position of a target longitudinal mode in a second set of longitudinal modes in the nonlinear optical resonant cavity in a controlled manner, such that the Brillouin gain coincides with the target longitudinal mode; and wherein the nonlinear optical resonant cavity continuously generates a Brillouin laser at the target longitudinal mode in the case that a pump power of the pump laser exceeds a threshold for generating the Brillouin laser; and wherein the Brillouin laser generates the optical frequency comb through a Kerr nonlinear four-wave mixing process.

10. The generation apparatus according to claim 9, wherein the nonlinear optical resonant cavity is an optical resonant cavity having both Brillouin nonlinearity and Kerr nonlinearity.

11. The generation apparatus according to claim 9, wherein the nonlinear optical resonant cavity is one of a traveling wave resonant cavity or a standing wave resonant cavity.

12. The generation apparatus according to claim 9, wherein the longitudinal modes in the nonlinear optical resonant cavity are introduced by different polarization modes of the nonlinear optical resonant cavity or by transverse modes of different orders.

13. The generation apparatus according to claim 9, wherein at least one set of longitudinal mode exists in the nonlinear optical resonant cavity.

\* \* \* \* \*